Oct. 2, 1951        J. A. COLLINS        2,570,100

FISH LURE

Filed Jan. 10, 1950

INVENTOR
JOHN A. COLLINS

Walter H Wakefield

ATTORNEY

Patented Oct. 2, 1951

2,570,100

UNITED STATES PATENT OFFICE 2,570,100

FISH LURE

John A. Collins, Worcester, Mass.

Application January 10, 1950, Serial No. 137,860

7 Claims. (Cl. 43—42.36)

This invention relates to fish lures or plugs and it is the general object of the invention to provide a lure having a hook carrying part or assembly to which any one of several differently shaped or colored bodies may be readily and quickly attached.

It has been proposed heretofore to provide lures so made as to permit interchange of bodies of different types on a hook carrying part, but so far as known such lures have required some form of holding means movable with respect either to the body or hook part in order to hold them together.

It is an important object of the present invention to provide a fish lure comprising but two parts, a body and a hook support, so made that they can be snapped into holding relation without requiring the use of a third part.

It is a more particular object of the invention to provide a lure body having holding elements fixed permanently to it to cooperate with a hook holding member having a resilient tongue or the like to grip one of the elements and having a slot to receive the other element. The tongue and slot are so related that after one of the elements is in the slot the tongue can be moved into holding relation with respect to the other element.

It is a further object of the invention to provide a hook carrying member made of inherently resilient material, such as sheet metal, and formed with two slots defining with the member two tongues one of which overhangs one of the holding elements on the body and is not necessarily resilient to any appreciable extent and the other of which will be sufficiently resilient to permit it to be snapped into holding relation with the other holding element. Notches in the resilient tongue and hook member serve as a form of lock which is readily releasable from the other holding element to permit separation of the body and hook carrying member.

With these and other objects in view which will appear as the description proceeds, the invention resides in the combination and arrangement of parts hereinafter described and set forth.

Figure 1:
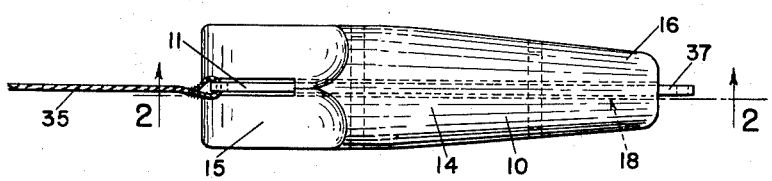
Figure 2:
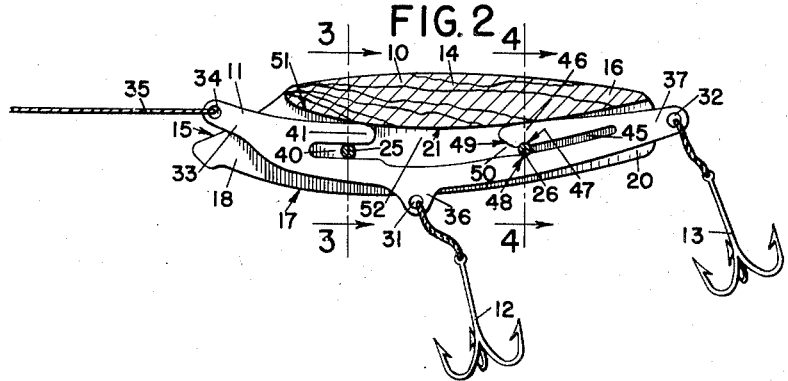
Figure 3:
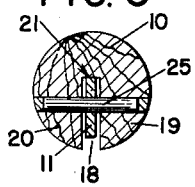
Figure 4:
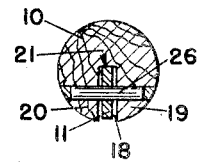
Figure 5:
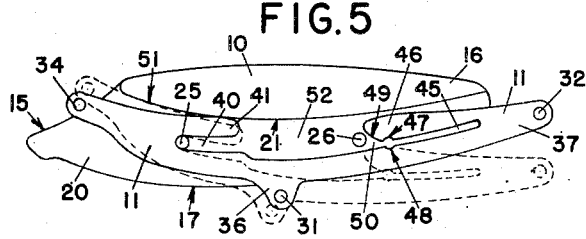

In the accompanying drawing which shows a convenient embodiment of the invention, Fig. 1 is a plan view of a fish lure made according to the present invention, Fig. 2 is a vertical longitudinal section on line 2—2, Fig. 1, Figs. 3 and 4 are transverse vertical sections on lines 3—3 and 4—4, respectively, Fig. 2, and Fig. 5 is a diagrammatic side elevation showing steps in the assembly of the parts of the lure.

Referring to the drawing, the fish lure includes a body 10 and a hook carrying member or plate 11 from which are suspended fish hooks 12 and 13. The body 10 may be made of any suitable material, such as wood, and may be made in any shape calculated to attract fish.

As shown in Figs. 1 and 2 the body 10 has a back 14 and its head or left end is formed with a downwardly and forwardly inclined surface 15, while its rear or right end may taper as at 16 in imitation of a minnow. Extending upwardly from the bottom 17 of the body is a vertical narrow longitudinally extending slot 18 dividing the body into two lower sides 19 and 20, see Fig. 3. The top 21 of the slot extends lengthwise of the body under the back 14.

Driven into the body 10 through the sides 19 and 20 and below the top 21 of slot 18 are two spaced preferably metal pins 25 and 26. Both pins extend across the slot above the bottom 17, pin 25 being near the head end of the lure and pin 26 being near the tail end as shown in Fig. 2. The pins are shown as convenient holding elements fixed permanently to the body and extending across slot 18, but the holding elements need not necessarily be in the form of the pins as shown for instance in Figs. 3 and 4.

Located in the slot 18 is the elongated plate 11 which has eyelets 31 and 32 for the hooks 12 and 13, respectively. The head or left end 33 of plate 11 has an eyelet 34 for the fish line 35. Eyelet 31 is in a lobe 36 on the under side of the plate 11 extending downwardly below the bottom 17 of the body 10, while eyelet 32 is in the tail end 37 of plate 11 projecting beyond the tail end of the body.

The plate 11 has a longitudinally extending slot 40 near the head end thereof opening upwardly and defining a tongue 41 over the slot and directed toward the longitudinal center of the plate. The slot is of such width as to fit the pin or holding element 25 and extends to the right and left of it.

Plate 11 has a second longitudinally extending upwardly opening slot 45 near the tail end thereof opening toward slot 40 and forming a resilient tongue or arm 46 the inner end of which is formed with a notch 47 on the lower side thereof to receive pin or holding element 26. A second notch 48 in the lower part of plate 11 under tongue 46 is opposite to notch 47 and also receives pin 26. The inner end of tongue 46 is inclined upwardly and to the left of pin 26 as at 49 to form with the body of the plate 11 a guide pocket 50 tapering toward notches 47 and 48.

After the body 10 and plate 11 have been made as described the head end of the plate will be placed in the left end of slot 18 and the plate then moved until pin 25 is in the left end of slot 40, as shown in dotted lines in Fig. 5. The left end 51 of the top 21 of slot 18 curves upwardly to allow plate 11 to assume the dotted line position with the inner end of tongue 46 below and slightly to the right of pin 26. At this time tongue 46 will be in its normal unstressed position with respect to the body of plate 11, that is, with the notches 47 and 48 spaced a distance less than the diameter of pin 26. The right end of plate 10 is then raised to the full line position of Fig. 5, after which the plate is moved to the left to cause pin 26 to move into pocket 50 and along inclined edge 49 to lift tongue 46 and thereby spread the notches 47 and 48 so pin 26 can enter them. The amount of movement of plate 11 to the left from the full line position of Fig. 5 to the position of Fig. 2 is less than the length of slot 40, and pin 25 will therefore be under tongue 41 intermediate the ends of slot 40 to position the left end of the plate with respect to the body 10 when the parts are assembled. As is apparent in Fig. 2 the tongues point toward each other, or in opposite directions, and the distance between their adjacent ends is less than the distance between elements 25 and 26.

By a procedure the reverse of that just described the body 10 can be detached from plate 11, after which another body having a different appearance can be attached to the plate. The distance between element 25 and the right end of slot 40, Fig. 2, is preferably somewhat greater than the distance between element 26 and the left end of tongue 46 to permit sufficient motion of the plate 11 to the right to effect detachment of tongue 46 from element 26. A number of different lure or plug bodies can be kept on hand to permit exchanges until a body serving as attractive bait is found.

The pull which the user of the lure exerts on line 35 in a direction toward the left, Fig. 2, serves to hold the pin 26 in properly seated position in notches 47 and 48, and there is no tendency during casting or trolling for the pin 26 to work out of the notches toward the pocket 50.

From the foregoing it will be seen that the invention provides a simple two part fish lure or plug having a hook carrying plate to which a body is held in such manner that it can be readily detached. The plate has a slot through which one of the holding elements, pin 25, passes and has a resilient tongue or arm 46 which holds the other holding element, pin 26, in the notches 47 and 48. By simple movements of the plate first to the right toward the tail of the body, and then to the left toward the head end of the body, the two parts can be secured together without the use of latches or similar devices. The plate is made of any suitable flat material, such as sheet metal, possessed of sufficient resilience to enable the tongue 46 to grip pin 26. The eyelet 31 is always below the bottom 17 of body 10 during assembly, hence the cord for attaching hook 12 never enters slot 18. The ends of tongues 41 and 46 facing each other are separated by a space 52, Fig. 5, which is relatively long, but it will be sufficient if space 52 is just wide enough to pass pin 25. The slot 40 will be longer than pocket 50 to enable pin 25 to be in the slot when pin 26 is seated in notches 47 and 48, and pin 26 will be at such a distance from pin 25 as to permit tongue 46 to swing up to the right of pin 26, Fig. 5, when pin 25 is at the left end of slot 40.

Having thus described the invention it will be seen that changes and modifications of the foregoing specific disclosure may be made without departing from the spirit and scope of the invention.

What is claimed as new is:

1. In a fish lure, an elongated one piece body having head and tail ends and having a longitudinally extending vertical slot in the lower part thereof, two support elements fixed rigidly and permanently to the body and extending across said slot, one element adjacent to the head end and the other element adjacent to the tail end of the body, a fish hook holding plate in said slot having provision for attachment to a line near the head end of the body and having sliding engagement with said one element, and a resilient tongue integral with the plate having releasable clamping engagement with the other element and detachable from said other element by movement of the plate toward the tail end of the body.

2. In a fish lure, an elongated one piece body having therein a vertical slot extending lengthwise thereof and opening downwardly through the bottom of the body, two holding elements spaced longitudinally of the body rigidly secured to the latter and extending across said slot, a fish hook holding member in said slot formed with a slot receiving one of said elements and opening upwardly and toward the longitudinal center of said body on one side of said center, and a resilient tongue on the upper part of said holding member on the opposite side of said center extending toward the latter and having holding engagement with the other element and yieldable due to the resilience thereof to become detached from said other element when the holding member is moved relatively to the body in a direction from the first element toward the second element.

3. In a fish lure, an elongated one piece body having head and tail ends and formed with a longitudinally extending vertical slot in the lower part thereof opening downwardly through the bottom of the body, two holding elements rigidly secured to the body and extending across said slot, one element adjacent to the head end and the other element adjacent to the tail end of the body, a fish hook holding member in said slot formed with a slot opening upwardly and toward the tail end of the body and receiving said one element intermediate the ends thereof, and a resilient tongue on the upper part of said member pointing toward the head end of the body and cooperating with said member to maintain holding engagement with the other element, the member when moved toward the tail end of the body causing said tongue due to the resilience thereof to become detached from said second element, after which movement of the member toward the head end of the body and then downwardly causes the first element to move upwardly out of the slot therefor to permit removal of the member from the body.

4. In a fish lure, an elongated body having head and tail ends and formed with a lengthwise vertical slot opening through the bottom of the body, two holding elements secured rigidly to the body and extending across said slot, one element adjacent to the head end and the other element adjacent to the tail end of the body, a fish hook holding member in said slot having part thereof under said elements, a tongue on the member over said one element extending lengthwise of the body on both sides of said one element, and a second tongue on the member over the other element, said tongues pointing toward each other and spaced apart a distance less than the distance between said elements measured lengthwise of the body, the second tongue being resilient and cooperating with the part of the member under said second element to grip the latter, the member when moved toward the tail end of the body causing the second tongue to become disengaged from said other element and the member when thereafter moved toward the head end of the body moving the first tongue out of engagement with said one element, whereupon the latter is free to pass between said tongues by a downward movement of the member relative to the body to permit removal of the member from the body.

5. In a fish lure, an elongated one piece body having transversely spaced longitudinally extending walls on the under side thereof, two holding elements secured rigidly to said walls and extending across the space between the latter and spaced longitudinally of the body, a fish hook supporting plate between said walls having a part thereof extending under said elements, said plate having a slot therein formed partly by said part thereof receiving one of said elements and opening upwardly and toward the other element, said slot extending longitudinally of the body on both sides of said one element, and a resilient tongue formed integral with said plate over said part of the latter and over the other element and having a notch therein receiving said other element opening toward said slot, the distance between said slot and notch being less than the distance between said elements measured lengthwise of said body, said tongue due to the resilience thereof cooperating with said part of the plate thereunder to hold the plate yieldingly against said other element, the plate when moved relatively to the body in a direction from said one element toward the other element causing said tongue due to the resilience thereof to effect removal of said other element from said notch and become disengaged from said other element, whereupon said plate when moved angularly around said one element to move said tongue downwardly away from said other element is movable in the opposite direction to effect removal of said one element from said slot, whereupon said plate is detachable from said body.

6. In a fish lure, an elongated body having in the underside thereof a lengthwise vertical downwardly opening slot, two holding elements secured to the body extending across said slot and spaced a given distance lengthwise of said body, a fish hook holding plate in said slot, and two tongues on said plate pointing toward each other and having their adjacent ends spaced from each other by a distance less than said given distance, each tongue forming with the body a lengthwise slot under the tongue opening upwardly between the tongues, one of said elements being in one slot intermediate the ends thereof and under the tongue corresponding thereto, the other element being in the slot corresponding to the other tongue and the latter being resilient and cooperating with said plate to hold the latter yieldingly to said other element for detachment from the latter, said plate being removable from the body by movement relative to the latter first in a direction from said one element toward said other element to detach said other tongue from said other element while said one element is in said one slot and then by movement in the opposite direction to disengage the first tongue from said one element.

7. In a fish lure, an elongated body having in the underside thereof a lengthwise vertical downwardly opening slot, two holding elements secured to the body extending across said slot and spaced lengthwise of said body, a fish hook holding plate in said slot, two tongues on said plate pointing in opposite directions lengthwise of the body, each tongue forming with the plate a lengthwise upwardly opening slot, one of said elements being under one of said tongues and intermediate the ends of the corresponding slot, the latter having a closed end opposite to the open end thereof, the other tongue being resilient and having a free end cooperating with the plate to detachably grip the other element in the other slot, the distance between said free end of the other tongue and said other element being not greater than the distance between said one element and the closed end of the slot corresponding thereto.

JOHN A. COLLINS.

REFERENCES CITED

The following references are of record in the file of this patent:

UNITED STATES PATENTS

| Number | Name | Date |
|---|---|---|
| 1,365,813 | Brown | Jan. 18, 1921 |
| 1,807,283 | Dick | May 26, 1931 |
| 1,955,408 | Chapleau et at. | Apr. 17, 1934 |
| 2,006,604 | Post | July 2, 1935 |